United States Patent [19]

Farrell

[11] 4,271,819
[45] Jun. 9, 1981

[54] SOLAR ENERGY APPARATUS

[76] Inventor: Daniel L. Farrell, 328 Plumer Ave., Pittsburgh, Pa. 15202

[21] Appl. No.: 21,998

[22] Filed: Mar. 19, 1979

[51] Int. Cl.³ .............................................. F24J 3/02
[52] U.S. Cl. .................................. 126/417; 126/429; 126/431; 126/448; 52/521; 52/522; 52/536
[58] Field of Search ............... 126/449, 432, 431, 429, 126/443, 448, 450, 417; 52/18, 123 R, 521, 522, 536, 553

[56] References Cited

U.S. PATENT DOCUMENTS

| 246,626 | 9/1881 | Morse | 126/429 |
|---|---|---|---|
| 330,917 | 11/1885 | Northrop | 52/521 |
| 2,559,870 | 7/1951 | Gay | 126/429 |
| 2,642,968 | 6/1953 | Roush et al. | 189/86 |
| 2,777,549 | 1/1957 | Roebuck | 189/86 |
| 3,054,223 | 8/1962 | O'Brien | 50/268 |
| 3,394,520 | 4/1966 | Skelton, Jr. | 52/521 |
| 3,918,430 | 11/1975 | Stout et al. | 126/270 |
| 4,029,080 | 6/1977 | Warren | 126/270 |
| 4,046,133 | 9/1977 | Cook | 126/429 |
| 4,069,809 | 1/1978 | Strand | 126/270 |
| 4,073,282 | 2/1978 | Schriefel et al. | 126/270 |
| 4,076,015 | 2/1978 | Mattson | 126/271 |
| 4,077,393 | 3/1978 | Mattson | 126/271 |
| 4,111,188 | 9/1978 | Murphy, Jr. | 52/536 X |
| 4,120,282 | 10/1978 | Espy | 126/270 |
| 4,178,911 | 12/1979 | Mattson | 126/449 |

FOREIGN PATENT DOCUMENTS 872817  7/1961  United Kingdom ............... 52/522

Primary Examiner—Samuel Scott
Assistant Examiner—Randall L. Green
Attorney, Agent, or Firm—Arnold B. Silverman

[57] ABSTRACT

A solar energy structure which includes translucent panel members which cooperate to define a series of closed air spaces which may be generally V-shaped. Through panel configuration and interlocks the solar energy is permitted to pass through the panel structure which also serves to provide thermal insulation and drainage. In one embodiment, a panel member located between the starter panel and the flasher panel may be generally W-shaped having one sector serving as the inside air space defining surface for one closed air space and another sector serving as the outside air space defining surface for another closed air space.

22 Claims, 14 Drawing Figures

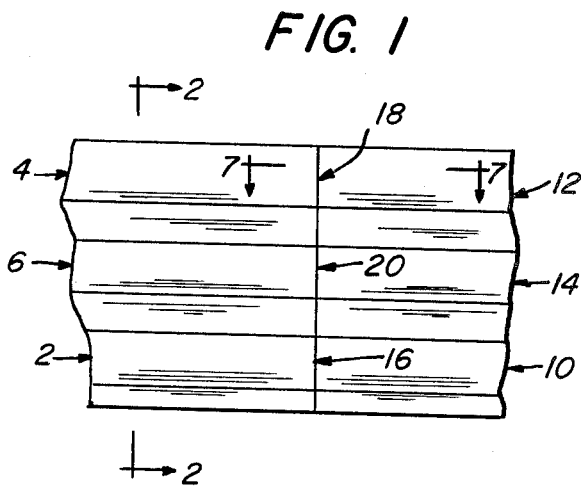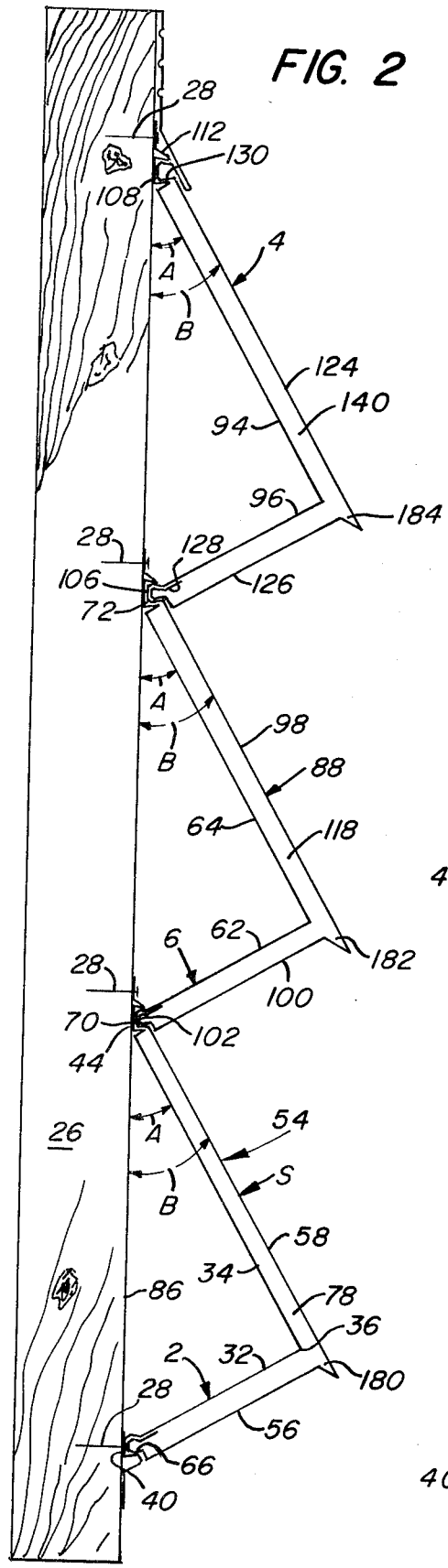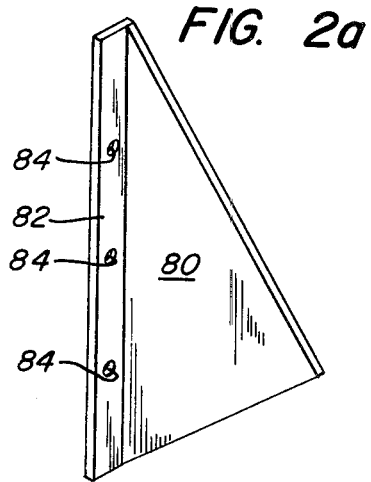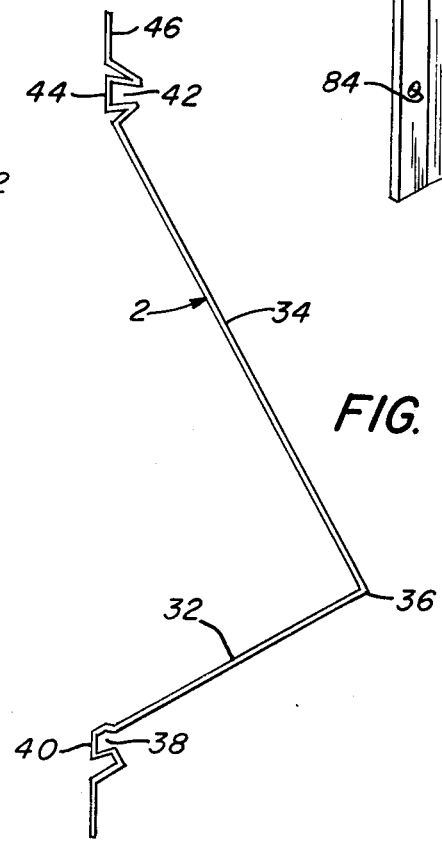

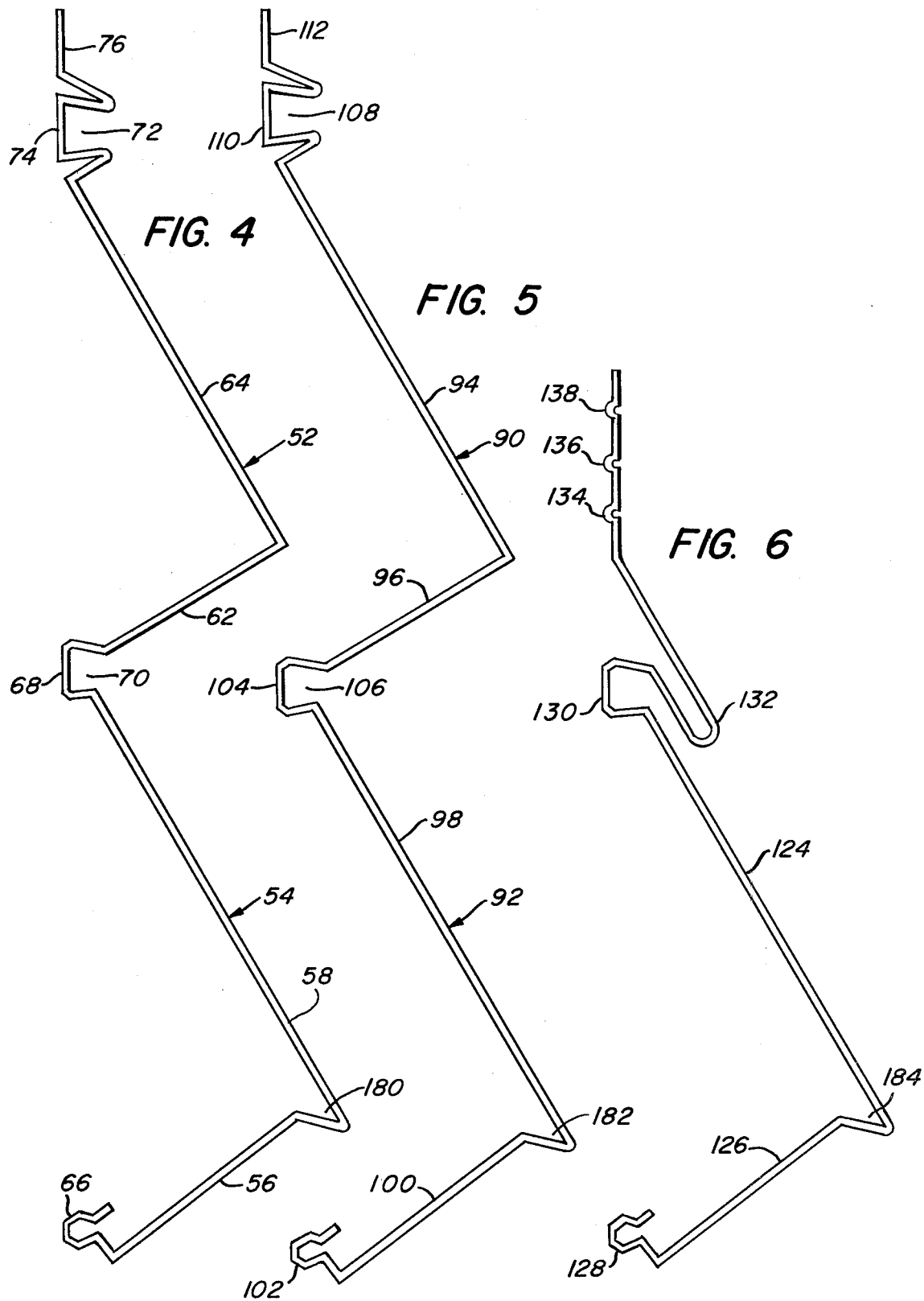

SOLAR ENERGY APPARATUS

BACKGROUND OF THE INVENTION

1. Field of the Invention

This invention relates to solar energy assemblies which are adapted to provide decorative and functional means for collecting radiant solar energy and, more specifically, it is directed toward unique panel constructions adapted for such purposes.

2. Description of the Prior Art

Various forms of functional and decorative building construction components positioned on building exteriors such as vertical exterior walls and roofs have been known for years. Not only has it been known to provide decorative wall coverings for the interior, but various forms of exterior siding have been known. See, for example, U.S. Pat. Nos. 2,642,968, 2,777,549, 3,054,223 and 3,394,520.

As a result of the shortage of energy on a worldwide basis, more and more effort is being directed toward more efficient use of existing energy supplies. For example, in order to conserve our coal, gas and oil reserves more emphasis has been placed upon maintaining of residential and commercial structures at reduced temperatures in cold weather and providing increased thermal insulation to minimize heat loss. There has also been a great deal of emphasis directed toward the use of solar energy in heating of buildings, heating of hot water and other uses.

U.S. Pat. No. 3,918,430 discloses a hot water solar system adapted for use on a roof or other portion of a building. A plurality of water channels are housed within a rigid frame underlying a series of layers of plastic material.

U.S. Pat. No. 4,029,080 discloses a thermal collector for a solar energy system. The prime thrust of this disclosure is directed toward an air system adapted for use on a roof.

U.S. Pat. No. 4,069,809 discloses a solar system wherein a series of building blocks have transparent members for permitting passage of the sun's rays therethrough. The series of blocks provides a vertical air channel passing immediately behind the transparent window in each block and a series of three generally vertically oriented passageways positioned within each block remote from the front transparent window.

U.S. Pat. No. 4,120,282 discloses a solar system consisting of a number of fixed flat plate solar reflectors and collectors.

U.S. Pat. No. 4,073,282 discloses a solar collecting system wherein a matrix of expanded sheets having large openings is employed to collect the sun's radiant energy. Means are provided for circulating air through the chamber and into contact with the slit and expanded sheets.

U.S. Pat. Nos. 4,076,015 and 4,077,393 each disclose systems wherein modular elements provide a plurality of raised surfaces for receipt of the sun's rays as used in combination with raised reflective surfaces. Among the problems encountered with known solar collecting systems are the somewhat unsightly nature of the same and, in some instances, the expense of installing the same.

There remains a need for a solar collecting system for exterior walls, roofs and other portions of buildings which is both decorative and functional. There is a further need for such systems which can be applied readily to preexisting buildings as well as buildings designed and constructed with the solar energy system in mind.

SUMMARY OF THE INVENTION

The present invention has met the above-described needs and has provided a number of improvements over the prior art. The present invention provides a substrate means to which solar panels are secured. An elongated translucent, generally V-shaped starter panel is secured to the substrate means with the apex of the panel being disposed outwardly. An elongated translucent generally W-shaped main panel has a lower generally V-shaped portion of generally complementary shape with respect to the starter panel and being secured in spaced outward position therefrom to define a generally V-shaped closed air space therebetween. The main panel means has an upper generally V-shaped portion which cooperates with an additional translucent generally V-shaped panel to define a second generally V-shaped closed air space therebetween. Additional translucent panel members may be provided to establish a series of generally V-shaped closed air spaces which are translucent. Energy receiving means are disposed inwardly of the panel assembly in order to permit the sun's rays impinging upon the panel assembly to pass therethrough and be received thereby.

It is an object of the present invention to provide a decorative and functional solar panel assembly which may be economically made and installed.

It is another object of this invention to provide such a panel assembly which permits ready passage of solar energy therethrough while resisting loss of heat to the building exterior by providing a series of closed air spaces.

It is another object of this invention to provide such panels in interlocked, sealed relationship so as to resist the entry of foreign matter into the building interior.

It is another object of the present invention to provide a siding or roof shingle panel assembly wherein undesired vibrations due to wind currents are resisted.

It is another object of the present invention to provide such panel assemblies which will not appreciably increase the weight load on the building in comparison to the load experienced with many known prior art solar systems.

It is yet another object of the present invention to provide such a panel assembly which contains integral drainage means to dispose of both condensation and infiltration water.

It is another object of the present invention to provide a durable panel assembly which does not conduct heat or electricity and will not interfere with radio or television reception.

It is yet another object of this invention to provide such a panel assembly which can be made from a fireproof, self-extinguishing material which does not require painting in order to remain attractive.

These and other objects of this invention will be more fully understood from the following description of the invention on reference to the illustrations appended hereto.

BRIEF DESCRIPTION OF THE DRAWING

FIG. 1 is a fragmentary front elevational view showing a portion of a panel assembly of the present invention.

FIG. 2 is a cross sectional illustration of the panel assembly shown in FIG. 1 taken through 2—2.

FIG. 2a is a perspective view of a form of end plate usable with the panel assembly of this invention.

FIG. 3 is a cross sectional illustration of a form of starter panel of the present invention.

FIG. 4 is a cross sectional illustration of a main panel of the present invention.

FIG. 5 is a cross sectional illustration of an additional translucent panel of the present invention.

FIG. 6 is a cross sectional illustration of a form of flasher panel of the present invention.

DESCRIPTION OF THE PREFERRED EMBODIMENTS

Figure 7:
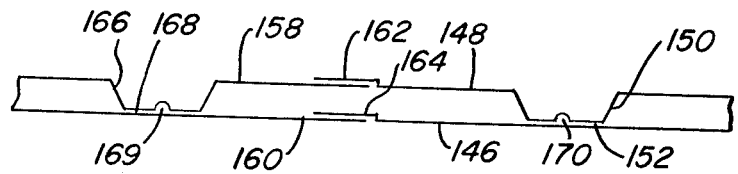
FIG. 7 is a cross sectional illustration of the panel assembly of FIG. 1 taken through 7—7.

As used herein directional language such as "out", "up", "down", "in", other forms of these words and any other directional language shall, unless the specific usage expressly indicates to the contrary, refer to position relative to other components in the radiant solar apparatus as distinguished from absolute directions. For example, in a vertical wall, the direction "upwardly" from a first lower panel to a second upper panel would be generally vertical, whereas on a sloping roof the direction from a first lower panel to a second upper panel would be angularly upwardly. In the context of the present disclosure in the absence of an express indication to the contrary both of these examples would constitute one panel being positioned upwardly with respect to the other.

The term "panel" shall refer to a building component positioned generally exteriorly of the building regardless of whether it is employed on a vertical wall as siding, on a roof, or in other locations and shall also expressly include use on structural members attached to or adjacent to buildings such as a patio enclosure, for example, and uses more remote from buildings such as fences, for example.

The term "foreign matter" shall refer to infiltration moisture, as well as other liquid and solid materials, the entry of which into the building or panel assembly would be undesirable in respect of efficiency of performance of the solar system or would be undesirable in respect of aesthetic considerations or would be otherwise desirable.

Referring now more specifically to FIG. 1, there is shown a panel assembly which includes a starter panel 2 a flashing panel 4 and an interposed main panel 6. The assembly also includes starter panel 10, flashing panel 12 and main panel 14. Starter panel 2 is secured to starter panel 10 at vertical joint 16 which will be discussed in greater detail hereinafter. Similarly, flashing panel 4 is secured to flashing panel 12 at vertical joint 18 and main panel 6 is secured to main panel 14 at vertical joint 20.

Referring now to FIG. 2, there is shown a substrate member 26 which in the form shown is a wooden stud, but could take a number of other forms. The panel assembly is shown secured to the substrate means by nails 28, but other fastening means could be used if desired.

Referring to FIGS. 2 and 3, a detail of the starter panel is illustrated in FIG. 3. The panel is generally V-shaped and has a lower leg 32, an upper leg 34, and an apex 36 which is disposed outwardly of substrate 26. The lower end of lower leg 32 is provided with integrally formed, outwardly open channel 38, the base of which 40 serves as a nailing or fastening tab. The upper end of upper leg 34 has formed therein an outwardly open channel 42, the base of which 44 may serve as a fastening or nailing tab. If desired, portion 46 may serve as a fastening or nailing tab. It will be appreciated that, in the form shown, considered in cross section, the upper leg 34 is of greater length than the lower leg 32. Also, with the exception of possible use of a support means integrally formed within the panel (to be described hereinafter) the starter panel and all of the other panels of this system are preferably of substantially uniform cross section throughout their longitudinal extent. As a result, the panels may be manufactured readily through extrusion processes, molding processes or other advantageous means.

Referring now to FIGS. 2 and 4 a detailed consideration of a form of translucent main panel 6 will be considered. In the form shown, the main panel 6 has a generally W-shaped configuration which includes a generally V-shaped upper portion 52 and a generally V-shaped lower portion 54. The lower portion has a lower leg 56 and an upper leg 58 with, in the form shown, (considered in cross section) the upper leg 58 having a greater length. Similarly, the upper portion 52 has a lower leg 62 and an upper leg 64 with the upper leg (considered in cross section) in the form shown, being of greater length than the lower leg 62. The lower leg 56 of the lower portion 54 terminates in a hollow turned member 66 which is in resiliently maintained snap-fit engagement with channel 38 of the starter panel 2. Where the upper leg 58 of lower portion 54 meets the lower leg 62 of upper portion 52, there is provided a hollow tongue member 68 which is received within upper channel 42 of the starter panel 2. This hollow tongue 68 also serves to define an outwardly open channel 70. At the upper end of upper leg 64 there is defined an outwardly open channel 72, the base of which 74 may serve as a nailing tab or, alternatively leg portion 76 may serve this function.

As will be seen in FIGS. 2 through 4, the joints established between starter panel 2 and main panel 6 serve to define the generally V-shaped closed air space 78. It will be appreciated that in a preferred form of the invention the resiliently maintained snap-fit interengagement between tongue 66 and channel 38 and tongue 68 and channel 42 serve to provide the elongated sealed generally V-shaped dead air space 78 without the need for use of separate gasket means in the joint. Such means may be employed, however, if desired or deemed advantageous for a particular installation. It is noted that cooperation between lower leg 32 and upper leg 34 of the starter panel 2 with the lower leg 56 and upper leg 54 of the main panel 6, respectively, serves to define dead air space 78 as the generally V-shaped portions of these two panels 2, 6 are of generally complementary configuration with the main panel 6 being disposed exteriorly of and spaced outwardly from the starter panel 2. Also, it will be appreciated that suitable sealing end closures such as that shown in FIG. 2a should be provided in order to close longitudinal extremities of dead air space 78 as well as the hollow which lies behind the dead air space 78 i.e. between the panel assembly and the substrate means 26. In the form shown in FIG. 2a, the end plate consists of a web portion 80 from which flange 82 which contains a series of fastener receiving openings 84 projects. This end plate may advantageously be made from the same material as the panels so as to avoid differential thermal expansion and contraction.

In the preferred embodiment the smaller included angle between the lower leg 34 and the substrate surface 86 is represented by the angle A and the similar angle with respect to leg 54 is represented by angle B. These angles A, B are preferably of such magnitude as to maintain the surfaces of legs 34, 54 substantially perpendicular to the direction of impingement of the sun's rays as indicated by the arrow labeled "S". While the size of these angles A, B will generally be determined by this objective of perpendicular impingement taking into consideration the time of year the most solar heat is desired, in a preferred embodiment the angles A, B will be about 25 to 55 degrees.

As a result of the panel members being made of translucent material, the sun's rays will pass therethrough and into the energy receiving means which will be described hereinafter. Similarly, the generally V-shaped dead air space 78 resists loss of heat from the building to the exterior through the panel assembly, as well as dampening outside noises. The panels may advantageously be made of a fireproof, self-extinguishing material which requires no painting to maintain its appearance.

Referring now to FIGS. 2, 4 and 5, formation of the second sealed air space will now be considered. As is shown in FIGS. 2 and 5, the additional translucent generally W-shaped panel has substantially the identical configuration as the main panel. This panel 88 has a generally W-shaped configuration and is provided with an upper portion 90 and a lower portion 92. The upper portion 90 has an upper leg 94 and a lower leg 96 which combine to give the upper portion 90 a generally V-shaped configuration. Similarly, the lower portion 92 has an upper leg 98 and a lower leg 100 which cooperate to define a generally V-shaped lower portion configuration. The lower end of lower leg 100 has a hollow tongue member 102. The region where upper leg 98 of lower portion 92 meets lower leg 96 of upper portion 90 has a hollow tongue portion 104 which also serves to define a channel portion 106. The upper portion of upper leg 94 has an outwardly open channel 108. Channel base 110 or leg portion 112 may readily serve as fastener receiving portions.

Referring to FIGS. 2, 4 and 5, tongue 102 of lower leg 100 is received within channel 70 of main panel 6. Similarly, hollow tongue 104 is received within channel 72 of main panel 6. The upper leg portion 94 is secured through section 112 to substrate means 26 by nail 28. In this fashion, the main panel 6 cooperates with the additional panel 88 to define a second generally V-shaped closed air space 118. It will be appreciated that sealed air space 118 is not only sealed off from the exterior of the panel assembly, but also is sealed off from adjacent sealed air space 78.

Referring now to FIGS. 2, 5 and 6 the flashing panel 4 will now be considered in greater detail. The flashing panel 4 is generally V-shaped and has an upper leg 124 and a lower leg 126. The lower leg terminates in a hollow tongue member 128. The upper leg 124 terminates in a tongue 130 which in the form shown has a re-entrant fold 132 covering the opening. The upper portion of the leg has a series of grooves 134, 136, 138 which are adapted to receive fasteners such as nails 28. As shown in FIG. 2, the generally V-shaped flashing panel 4 is positioned outwardly of the upper portion of additional translucent panel 88 and cooperates therewith by having tongue 128 received within channel 106 and tongue 130 received within channel 108. This provides a third generally V-shaped closed air space 140. Upper leg 94 is disposed at angle A and upper leg 124 is disposed at angle B.

It will be appreciated, that for convenience of illustration, the invention as illustrated in these figures will show three generally V-shaped closed air passageways defined by a total of four panel elements. As a result of the design of the elements, however, it will be appreciated that additional panel elements such as that illustrated as the main panel 6 or additional translucent panel 88 may be employed to provide additional wall or roof or other building portion coverage. In using such additional members they may be interposed between an additional translucent panel and the flashing panel 12.

It will be appreciated, therefore, that the invention provides a decorative panel assembly which provides translucent upper portions of the closed generally V-shaped dead air space positioned so as to permit ready passage of the sun's rays therethrough, while providing a thermally insulating barrier to resist loss of heat to the building's exterior.

Figure 8:
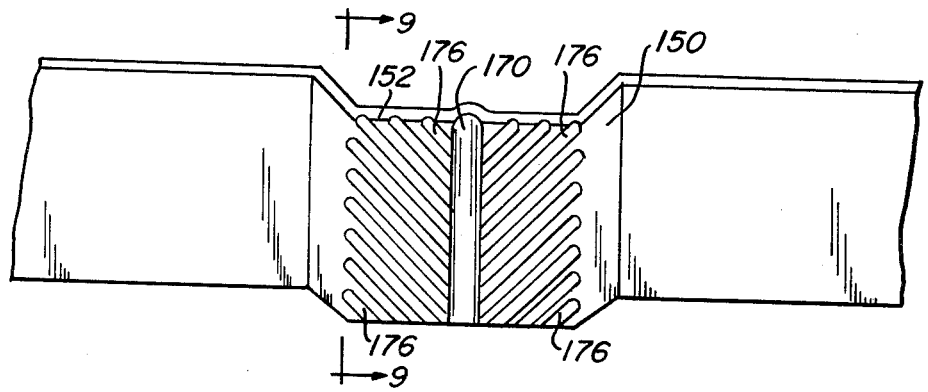
FIG. 8 is a fragmentary illustration of a portion of a panel of this invention illustrating drainage means.

Referring now to FIGS. 2, 7 and 8, another feature of the invention will be considered. In order to help maintain the desired spacing, between the interior panel portions and the exterior panel portions which serve to cooperate to define the dead air spaces, it is preferred that the upper legs 34, 64, 94 of the interior defining surface be provided with support means which contact the corresponding exterior upper leg surface 54, 98, 124. In the preferred form of the invention as is shown in FIG. 7, the upper leg of the exterior panel portion is indicated by the reference number 146 and the upper leg of the interior panel portion is indicated by the reference number 148. Integrally formed within the interior panel portion is an elongated generally vertically oriented hollow rib 150 which has a crest 152 in supporting surface-to-surface engagement with exterior panel portion 146. In this fashion the desired spacing is automatically maintained.

FIG. 7 also illustrates a convenient means for providing for vertical joints between adjacent panels of the same horizontal position of course level while permitting changes in dimension responsive to thermal conditions causing expansion or contraction. In this embodiment this is readily accomplished by providing for overlapping contact between the extremity of panel 158 and the offset end 162 of panel portion 148. Similarly, there is overlap provided between panel portion 160 and offset portion 164 of panel 146. Relative sliding movement responsive to thermal expansion and contraction and, extreme wind forces, is thereby permitted. Hollow rib 166 has crest 168 provided with drainage channel 169. By providing ribs 150, 166 in close relationship to the panel joints additional reinforcement to the joint as well as drainage and sealing to resist undesired entry of foreign matter are provided.

Figure 9:
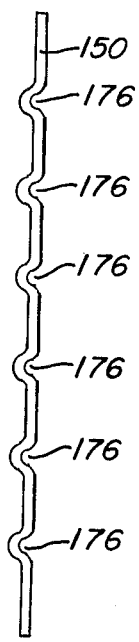
FIG. 9 is a cross sectional illustration of the panel shown in FIG. 8 taken through 9—9.

Referring once again to FIGS. 2, 7 and 8, a further feature of the invention will now be considered. As changes in temperature may result in condensation moisture being created within the generally V-shaped dead air spaces and in the unlikely event that infiltration moisture should be present, in the preferred embodiment of the invention, drainage channels 170, 169 are integrally formed respectively, within supporting ribs 150, 166. This permits any moisture entering the joints or adjacent areas to be drained under the influence of gravity downwardly within the upper segment of the generally V-shaped closed air space in order to improve the efficiency with which moisture is withdrawn from the interior region. As shown in FIG. 8, a series of angularly disposed drainage grooves may be formed within surface portions 152 of rib 150 to permit flow under the influence of gravity downwardly and toward the drainage channel 170. These grooves which have been designated generally by the reference number 176 (See FIG. 9) facilitate efficient withdrawal of moisture.

Referring to FIG. 2 once again, it will be appreciated that the lower extremities of the upper legs 54, 98, 124 of the outer panel portions contain integrally formed horizontally oriented drainage channels 180, 182, 184 which are in communication with drainage grooves 170 so as to receive moisture therefrom and carry them horizontally for harmless discharge.

Figure 10:
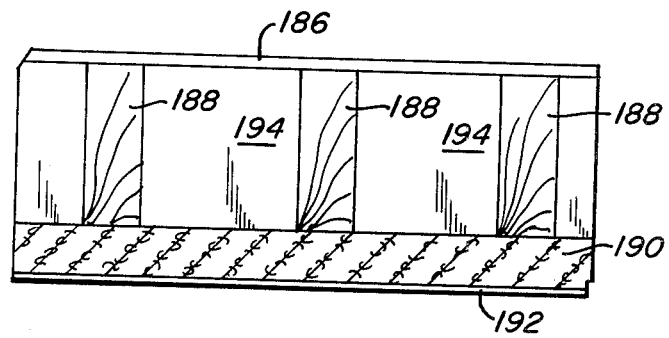
FIG. 10 is a partially schematic cross sectional view showing a panel assembly of this invention in combination with other portions of the building.

Reference is now made to FIG. 10 where more detailed reference will be made to the energy receiving means. The panel assembly which has been described above, is indicated generally by the reference number 186, and the substrate means which in the form shown are wood joists by the number 188. Thermal insulation 190 and the interior wall 192 are shown. The insulation 190 and interior wall 192 cooperate with the panel assembly 186 and the substrate means 188 to define a series of hollow generally vertically oriented ducts 194. The solar energy passing through the panel assembly 186 may be received within the ducts 194 and increase the temperature of the air therein with convection resulting in flow of the air through the ducts to whatever registers in the house or other building one may wish to discharge the air at elevated temperatures. Alternatively, other means for making use of the radiant solar energy entering ducts 194 through heat exchangers or other means may readily be employed. If desired, the interior surfaces of the duct defining members (exclusive of the panel assembly 186) may be coated with a dark paint or other heat absorbing material in order to improve the efficiency of heat absorption.

Figure 12:
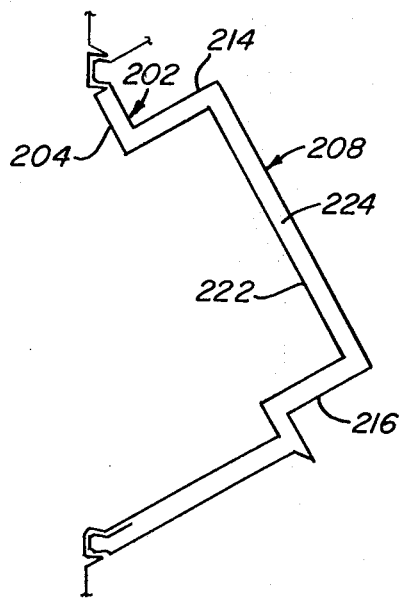
FIG. 12 is a cross sectional illustration of the panel construction of FIG. 11 taken through 12—12.
Figure 13:
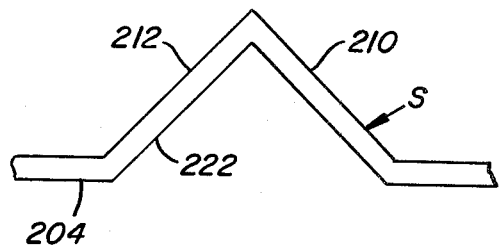
FIG. 13 is a cross sectional illustration taken through 13—13 of FIG. 11.
Figure 11:
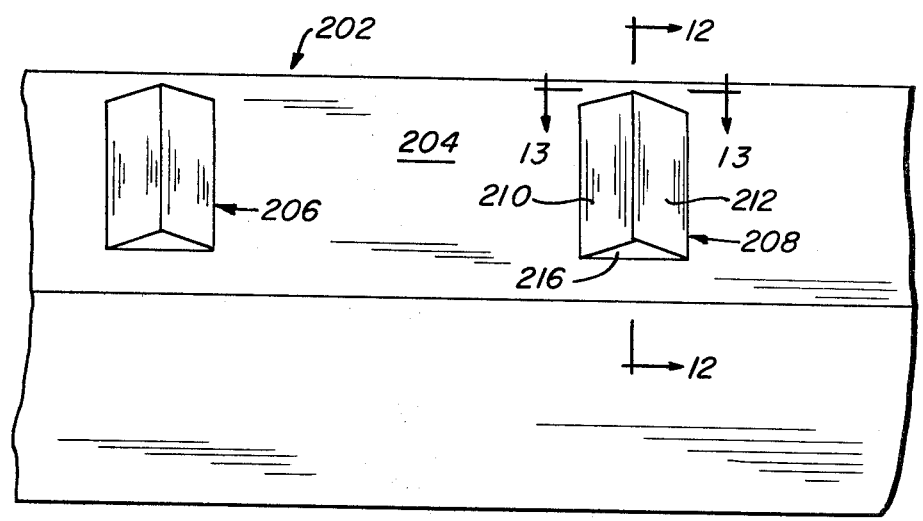
FIG. 11 illustrates a modified panel construction adapted for use in the present invention.

Referring now to FIGS. 11 through 13, another embodiment of the invention will be considered. As has been noted above, with reference to FIG. 2, in general it is contemplated that the siding will be positioned at an angle A so that the solar energy will impinge in a direction generally perpendicular with respect to the surfaces of the panels. For installations where it is desired to have further improvement of efficiency or where the building does not have a southern exposure in the region where the solar installation is to be made, the embodiment shown in FIGS. 11 through 13 may be employed advantageously. In this embodiment there is shown a panel 202 which has an upper leg portion 204 which has formed embossments 206, 208 therewith. These embossments present surfaces such as 210, 212 at such an angle as to be adapted to receive sun's rays impinging generally from a direction oriented generally parallel with the elongated longitudinal direction of the panel as distinguished from perpendicular to the panel face. (See the arrow S in FIG. 13). A pair of end walls 214, 216 of lesser area than the surfaces 210, 212 close the embossment. An interior wall 222 serves to cooperate to define the closed air space 224. The embossments 206, 208 may be provided spaced along the upper panel 204 with whatever spacing is desired for the particular installation. The panel assembly may otherwise be made essentially identical to that disclosed above. The embossments are preferably about 16 to 24 inches apart measured from apex to apex.

While the panels of the present invention serve to provide an inexpensive, highly efficient solar energy system while also providing an aesthetic, pleasing exterior covering for a building or portion thereof, it will be appreciated that the panel elements may be made of a wide range of materials such as translucent plastic materials, for example.

It will be appreciated that manufacture of these materials may be economically effected and that assembly of elongated panels permit reduction in the amount of labor required to cover a given area with the panel assembly. As the panels are lightweight, no significant additional weight loading to the structure is made as a result of the panel assembly being employed.

While it is essential that the material be translucent to the extent that it permits efficient passage of solar radiant energy therethrough, the panels may be made with varying degrees of translucency including being transparent if desired.

While the panels are adapted for use on a wide range of building exterior surfaces, it will be appreciated that they may most advantageously be employed as building siding or roofing panels or shingles. It will also be noted that as a result of the sloping nature of the panel assembly, the panel will tend to resist undesired accumulation of ice and snow thereon.

While, for convenience of illustration, reference has been made herein to the use of nails 28 as the fastening means, it will be appreciated that a wide variety of other types of fastening means including screws and staples for example, may readily be employed to secure the panels to the substrate.

It will be appreciated, therefore, that the present invention provides an economical means of establishing an effective solar energy collector system which is both functionally effective and decorative. This system provides efficient collection of solar energy, while providing a decorative exterior facade. A series of dead air spaces provides thermal insulation against the loss of heat to the exterior of the building. The elongated panels and interlocking joints facilitate establishing sealed panel assemblies without requiring the use of highly skilled labor. Panel assemblies resist the undesired entry of foreign matter into the interior and cooperate with various forms of means to transfer heat to building heating, hot water heating or other uses. Painting and other decorative or protective coatings need not be provided. It may be employed in existing structures or designed as a portion of new constructions.

Whereas particular embodiments of the invention have been described above for purposes of illustration, it will be evident to those skilled in the art that numerous variations of the details may be made without departing from the invention as defined in the appended claims.

I claim:

1. Apparatus for collecting radiant solar energy and forming a panel assembly comprising substrate means for securing solar panels thereto, an elongated translucent generally V-shaped starter panel traverse to and secured to said substrate means, upper and lower portions of said starter panel secured to said substrate means with the apex of said panel being disposed outwardly of said substrate means, an elongated translucent generally W-shaped main panel secured to said starter panel and having a lower generally V-shaped portion of generally complementary shape with respect to said starter panel, said lower generally V-shaped portion of said main panel overlapping and being generally spaced outwardly from said starter panel, end closure means cooperating with said starter panel and said lower portion of said main panel to define a first elongated closed air space, said main panel having an upper generally V-shaped portion, an additional translucent panel secured to said main panel and having a generally V-shaped portion disposed in overlapping generally spaced outward relationship with respect to said upper portion of said main panel, end closure means cooperating with said main panel upper portion and said additional panel portion to define a second elongated closed air space, and energy receiving means disposed inwardly of the panel assembly, whereby said main panel serves as the outer wall of said first closed air space and the inner wall of said second closed air space and sun's rays impinging upon said panel assembly will pass therethrough to said energy receiving means.

2. The solar energy apparatus of claim 1 wherein said additional translucent panel is of generally identical cross-sectional configuration as said main panel.

3. The solar energy apparatus of claim 2 wherein at least two said additional translucent panels are provided.

4. The solar energy apparatus of claim 2 wherein an elongated generally V-shaped flashing panel of generally complementary shape with respect to an upper portion of an uppermost said additional translucent panel is disposed in overlapping and generally spaced outwardly position with respect thereto, and end closure means cooperating with said flashing panel and said upper portion of said uppermost additional panel to define a closed air space therebetween, whereby said panel assembly will provide a series of generally V-shaped double translucent walls each having a closed air space therebetween.

5. The solar energy apparatus of claim 4 wherein at least a major number of said generally V-shaped closed air spaces have an upper portion which considered in cross section is longer than the lower portion thereof.

6. The solar energy apparatus of claim 1 wherein mechanical snap-in joints secure overlying and underlying panel portions.

7. The solar energy apparatus of claim 6 wherein each said joint is established by a tongue member of one said panel engaging a groove member of another said panel.

8. The solar energy apparatus of claim 7 wherein said joints provides elongated seals to resist entry of undesired foreign matter into the interior of said panel assembly.

9. The solar energy apparatus of claim 8 wherein said tongue members are hollow and resilient so as to facilitate snap fit interengagement with said grooves.

10. The solar energy apparatus of claim 9 wherein at least one panel has a number of generally outwardly projecting embossments formed in outer portions thereof, and said embossments have surfaces oriented generally transversely to the longitudinal extent of said panel.

11. The solar energy apparatus of claim 10 wherein said embossments have a pair of generally planer surfaces meeting at an apex and a pair of end walls, and said planar surfaces have greater area than said end walls.

12. The solar energy apparatus of claim 11 wherein said embossments within a said panel being spaced about 16 to 24 inches from each other measured from apex to apex.

13. The solar energy apparatus of claim 1 wherein said V-shaped panel portions have an upper leg and a lower leg, and generally outwardly directed support means are provided on at least some of said upper legs of inner panel portions for supporting adjacent outer panel portions.

14. The solar energy apparatus of claim 13 wherein said support means includes integrally formed outwardly directed ribs formed in said upper legs of said inner panel portions.

15. The solar energy apparatus of claim 14 wherein said upper leg has an upper end of the panel portion thereof and a lower end of the panel portion thereof, said ribs extend generally from said lower end to said upper end thereof, and said ribs being spaced along the longitudinal extent of said upper leg.

16. The solar energy apparatus of claim 14 wherein a generally horizontally disposed drainage channel is formed within outer panel portions.

17. The solar energy apparatus of claim 16 wherein said drainage channel is formed within the lower V-shaped portion of the generally W-shaped panel.

18. The solar energy apparatus of claim 17 wherein said ribs have an integrally formed drainage groove associated therewith and positioned so as to drain into said drainage channel under the influence of gravity.

19. The solar energy apparatus of claim 18 wherein said ribs have a plurality of secondary drainage grooves connecting the adjacent dead air space with said drainage groove.

20. The solar energy apparatus of claim 1 wherein said substrate means includes a series of spaced stud members.

21. The solar energy apparatus of claim 20 wherein said V-shaped panel portions have an upper leg and a lower leg, and said upper leg having a smaller included angle with said substrate means in the range of about 25 to 55 degrees.

22. The solar energy apparatus of claim 20 wherein said energy receiving means includes a series of ducts defined by interior wall portions cooperating with said studs and said panel assembly.

* * * * *